US012155576B2

United States Patent
Tu et al.

(10) Patent No.: US 12,155,576 B2
(45) Date of Patent: *Nov. 26, 2024

(54) PACKET CLASSIFICATION WITH MULTIPLE CLASSIFIERS

(71) Applicant: VMware LLC, Palo Alto, CA (US)

(72) Inventors: Cheng-Chun Tu, Redwood City, CA (US); Yifeng Sun, Sunnyvale, CA (US); Yi-Hung Wei, Mountain View, CA (US); Benjamin L. Pfaff, Redwood City, CA (US); Justin Pettit, Los Altos Hills, CA (US)

(73) Assignee: VMware LLC, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/135,347

(22) Filed: Apr. 17, 2023

(65) Prior Publication Data

US 2023/0262006 A1 Aug. 17, 2023

Related U.S. Application Data

(63) Continuation of application No. 16/003,077, filed on Jun. 7, 2018, now Pat. No. 11,632,332.

(51) Int. Cl.
*H04L 47/2483* (2022.01)
*H04L 43/028* (2022.01)
*H04L 67/568* (2022.01)

(52) U.S. Cl.
CPC ........ *H04L 47/2483* (2013.01); *H04L 43/028* (2013.01); *H04L 67/568* (2022.05)

(58) Field of Classification Search
CPC ....... H04L 45/74; H04L 45/745; H04L 47/34; H04L 29/06585; H04L 29/12207; H04W 28/065
See application file for complete search history.

(56) References Cited

U.S. PATENT DOCUMENTS

| 8,913,483 | B2 | 12/2014 | Pfaff et al. | |
|---|---|---|---|---|
| 9,244,843 | B1* | 1/2016 | Michels | ................. G06F 12/126 |
| 9,876,716 | B2* | 1/2018 | Fujita | ..................... H04W 72/56 |
| 11,632,332 | B2 | 4/2023 | Tu et al. | |
| 2015/0078384 | A1 | 3/2015 | Jackson et al. | |
| 2015/0081833 | A1 | 3/2015 | Pettit et al. | |
| 2015/0092778 | A1 | 4/2015 | Jackson et al. | |
| 2015/0117450 | A1 | 4/2015 | Thibaut | |
| 2015/0169451 | A1 | 6/2015 | Jackson | |
| 2015/0281098 | A1 | 10/2015 | Pettit et al. | |
| 2015/0319088 | A1* | 11/2015 | Wenig | ..................... H04L 69/22 |
| | | | | 370/392 |

(Continued)

*Primary Examiner* — Redentor Pasia
(74) *Attorney, Agent, or Firm* — Quarles & Brady LLP (57) ABSTRACT

Some embodiments provide a method for a forwarding element that receives a packet. The method determines whether the packet matches any flow entries in a first cache that uses a first type of algorithm to identify matching flow entries for packets. When the packet does not match any flow entries in the first cache, the method determines whether the packet matches any flow entries in a second cache that uses a second, different type of algorithm to identify matching flow entries for packets. The method executes a set of actions specified by a flow entry matched by the packet in one of the first and second caches.

20 Claims, 6 Drawing Sheets

(56) References Cited

U.S. PATENT DOCUMENTS

| | | | |
|---|---|---|---|
| 2016/0094460 A1* | 3/2016 | Shelar | H04L 45/56 |
| | | | 370/392 |
| 2017/0064048 A1* | 3/2017 | Pettit | H04L 45/50 |
| 2017/0126588 A1* | 5/2017 | Anand | H04L 47/31 |
| 2017/0171065 A1* | 6/2017 | Pettit | H04L 45/54 |
| 2018/0131603 A1* | 5/2018 | Ye | H04L 45/64 |
| 2019/0379606 A1 | 12/2019 | Tu et al. | |

\* cited by examiner

PACKET CLASSIFICATION WITH MULTIPLE CLASSIFIERS

CLAIM OF BENEFIT TO PRIOR APPLICATION

This application is a continuation application of U.S. patent application Ser. No. 16/003,077, filed Jun. 7, 2018, now published as U.S. Patent Publication 2019/0379606. U.S. patent application Ser. No. 16/003,077, now published as U.S. Patent Publication 2019/0379606, is incorporated herein by reference.

BACKGROUND

Software forwarding elements use packet classification algorithms (classifiers) to process network packets in order to implement network policy. These classifiers generally receive a packet and, based on characteristics of the packet, determine how the forwarding element should process the packet. However, certain limitations limit the utility of most classifiers for software forwarding element operations. For example, some classifier designs can only consider 5-tuples (IP source and destination address, transport layer protocol, and transport layer source and destination port numbers), and cannot be efficiently extended to handle the much larger number and variety of packet header fields present in modern networks. Other classifiers require large precomputation times (e.g., seconds or more), which is not adequate when the network environment can change quickly. In addition, classifiers that solve these problems have additional issues, such as a longer per-packet performance time. As such, a classifier is needed that is flexible, can accommodate changes quickly, and that improves the time required to classify a packet.

BRIEF SUMMARY

Some embodiments provide a forwarding element (e.g., a flow-based software forwarding element) that uses multiple classifiers with multiple different algorithms. The multiple classifiers are applied to packets in an order designed to improve per-packet classification time while retaining flexibility and the ability to make changes to classification policy without delays. Specifically, some embodiments use a first decision tree cache with a secondary tuple space search cache (that searches multiple subtables based on different sets of packet header fields).

The forwarding element of some embodiments initially searches the decision tree cache, and executes the actions specified by a matched flow entry if such a flow entry is found. In the case of a cache miss, the forwarding element then searches the subtables of the secondary cache for a matched flow entry. The caches are updated such that the secondary cache is guaranteed to have the most up-to-date flow entries, while the primary decision tree cache (which is generally faster to search but involves more resources and time to update) is only updated at certain intervals.

In some embodiments, each of the flow entries includes (i) a set of match conditions (e.g., a set of packet header field values) and (ii) a set of actions for the forwarding element to execute when a packet matches the set of match conditions. The match conditions for different flow entries may include values for different sets of packet header fields, which is why multiple subtables are required for the tuple space search (if all flow entries match on the same set of packet header fields, then only a single table would be required and the decision tree classifier would not provide the same advantages over the tuple space search classifier). Updates to the flow entries may include insertion of new flow entries, deletion of existing flow entries, and modifications to the set of actions specified by a flow entry (modifications to the set of match conditions is treated as a deletion of an existing flow entry and insertion of a separate new flow entry).

When the set of actions specified by a flow entry is modified, the forwarding element of some embodiments modifies both the primary cache and the secondary cache. Because the match conditions are not changed, this does not actually affect the structure of the decision tree or the subtables. When an existing flow entry is deleted, the forwarding element removes that flow entry from the appropriate subtable of the secondary cache. The entry is not actually removed from the decision tree, but instead the forwarding element marks the leaf node corresponding to that entry as invalid (such that a packet matching that entry is treated as a cache miss).

When a new flow entry is added, the forwarding element initially only adds the flow entry to the appropriate subtable of the secondary cache (or creates a new subtable for the flow entry if required). Because rebuilding the decision tree is a computation-intensive and time-intensive process, the forwarding element does not rebuild the decision tree every time a new flow entry is added. Instead, the forwarding element of some embodiments rebuilds the decision tree in the background at regular intervals using all of the new flow entries since the previous rebuild and removing all of the flow entries that have been marked as invalid in the current decision tree. This rebuilding may occur at regular timed intervals (e.g., every 5 seconds, every minute, etc.), once the cache miss rate for the decision tree exceeds a threshold, etc. After rebuilding the new decision tree, the forwarding element swaps out the old decision tree for the new decision tree.

In some embodiments, a classifier can include multiple flow entries (i.e., with different sets of match conditions) that one packet could match, so long as those flow entries have different priorities. However, if a new higher-priority flow entry is only added to the secondary tuple space search cache, then a packet might match a lower-priority flow entry in the primary decision tree cache without the forwarding element searching the secondary cache. To solve this issue, some embodiments mark the subtables in the secondary tuple space search cache to which new entries have been added since the previous decision tree rebuild, and search only these subtables after finding a matching flow entry in the decision tree. While this involves extra processing, it ensures that network policy is not violated and is faster than searching all of the subtables of the secondary cache.

In some embodiments, the multiple classifiers with multiple different search algorithms replace one of several classifiers used by a forwarding element. For example, some forwarding elements include (i) an exact-match cache that searches on a single set of packet headers for all packets such that each flow entry is only matched by a single data flow, (ii) an aggregate cache that searches on different sets of packet headers and for which each flow entry may be matched by multiple data flows, and (iii) a set of staged flow entry tables used when packets do not match any entries in the exact-match cache or the aggregate cache. The forwarding element generates the aggregate cache flow entries based on a first packet for a data flow (or set of data flows) being processed through the multiple stages of flow tables. In some embodiments, the decision tree cache is added as a primary aggregate cache, with the tuple space search used as a secondary aggregate cache.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a forwarding element (e.g., a flow-based software forwarding element) that uses multiple classifiers with multiple different algorithms. The multiple classifiers are applied to packets in an order designed to improve per-packet classification time while retaining flexibility and the ability to make changes to classification policy without delays. Specifically, some embodiments use a first decision tree cache with a secondary tuple space search cache (that searches multiple subtables based on different sets of packet header fields).

The forwarding element of some embodiments initially searches the decision tree cache, and executes the actions specified by a matched flow entry if such a flow entry is found. In the case of a cache miss, the forwarding element then searches the subtables of the secondary cache for a matched flow entry. The caches are updated such that the secondary cache is guaranteed to have the most up-to-date flow entries, while the primary decision tree cache (which is generally faster to search but involves more resources and time to update) is only updated at certain intervals.

Flow-based forwarding elements of some embodiments implement network policy through flow tables (e.g., Open-Flow flow tables), which are collections of flow entries. In some embodiments, each of the flow entries includes (i) a set of match conditions (e.g., a set of packet header field values) and (ii) a set of actions for the forwarding element to execute when a packet matches the set of match conditions. These actions can include outputting the packet to a particular port, dropping the packet, modifying certain packet header fields (e.g., MAC address replacement for L3 routing), etc. In addition, in some embodiments, flow entries include a priority, which is used by the forwarding element when packets match more than one flow entry to select the highest-matching entry. When a flow-based forwarding element receives a packet, the forwarding element finds the highest-priority matching flow entry, using one or more classifiers.

As mentioned, decision tree classifiers and tuple space search classifiers are examples of classifiers that use different search algorithms. If all of the flow entries of a classifier match on the same set of packet header fields, then a simple classifier that performs one search over these header fields can execute the search efficiently (e.g., by hashing the set of packet header fields, finding a matching hash value, and subsequently verifying that the matching flow entry does match the packet header field values). However, the match conditions for different flow entries will often include values for different sets of packet header fields. As such, tuple space search classifiers generally require multiple subtables (with separate hash computations for each subtable), whereas decision tree classifiers can perform their search more efficiently (but incorporate changes less easily).

Figure 1:
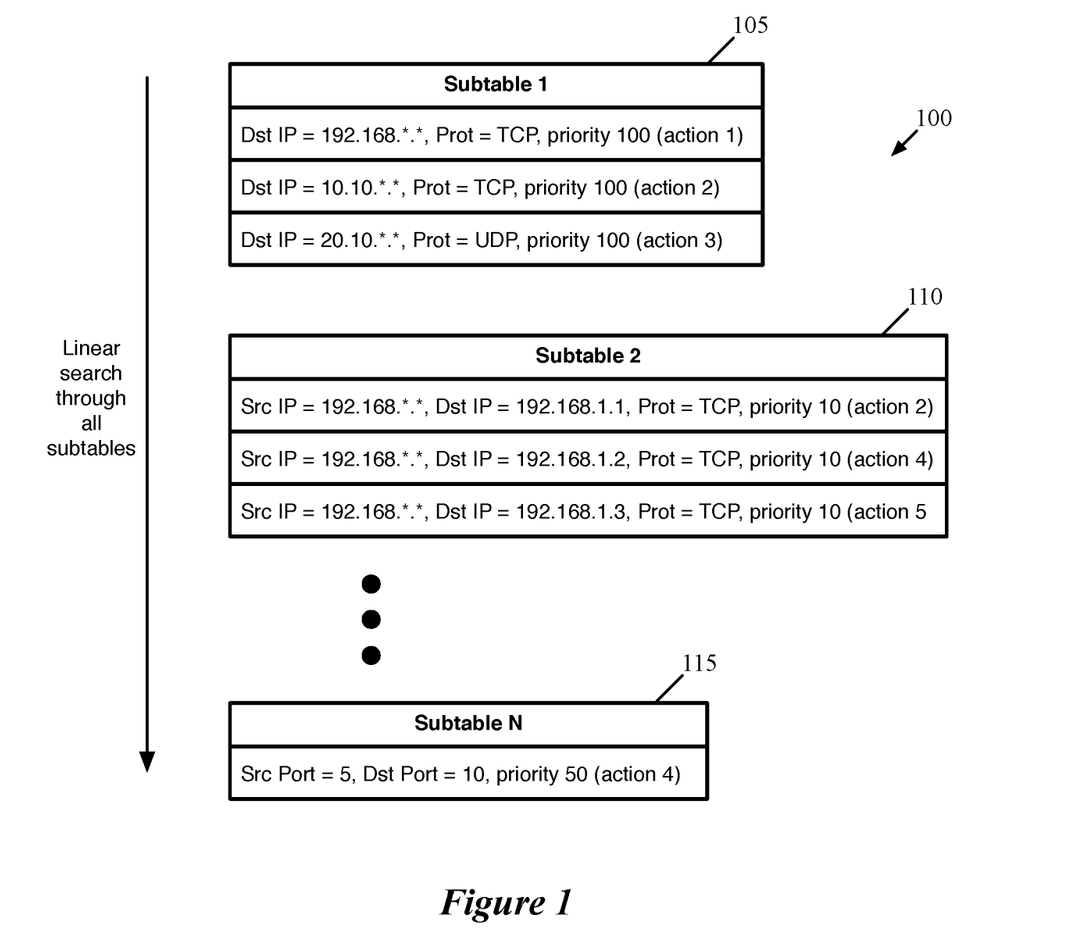
FIG. 1 conceptually illustrates a tuple space search classifier of some embodiments.

FIG. 1 conceptually illustrates a tuple space search classifier 100 of some embodiments. As shown, the classifier includes flow entries organized into multiple tables 105-115. The match conditions for each of the N tables (typically referred to as subtables) include different sets of packet header field values (or portions of packet header fields), with the other possible packet header fields treated as wildcards. For example, the first subtable 105 includes three flow entries that match on the first 16 bits of a packet's destination IP address, and the IP protocol field. The second subtable 110 includes three flow entries that match on the first 16 bits of a packet's source IP address, the entire destination IP address, and the IP protocol field. Finally, the last subtable 115 matches on only the transport layer (e.g., UDP or TCP) source and destination port numbers. Each of the flow entries also includes a priority and specifies an action to perform if matched. In this case, the priorities are important, as any packet that matches one of the flow entries in the second subtable 110 will also match the first flow entry in the first subtable 105. In this case, lower numbers indicate higher priority, so the actions specified by the second subtable flow entries will be executed.

Upon receiving a packet, a forwarding element using the tuple space search classifier 100 extracts all packet header field values used by any of the subtables 105-115 (these packet header field values are often referred to as the flow key). The forwarding element computes hashes for each subtable using the different combinations of packet header fields and uses these hashes to search each of the subtables for matching flow entries (though certain optimizations can be used to allow certain searches to skip some of the subtables). In some embodiments, the classifier identifies a matching flow entry in a particular subtable by matching the hash value of the packet header fields for the particular subtable with a hash value for the flow entry, then verifying that the packet header field values do actually match those required by the flow entry match conditions (and are not the result of a hash collision). As mentioned, if matches are found in more than one subtable, then the higher-priority matching flow entry is used.

Figure 2:
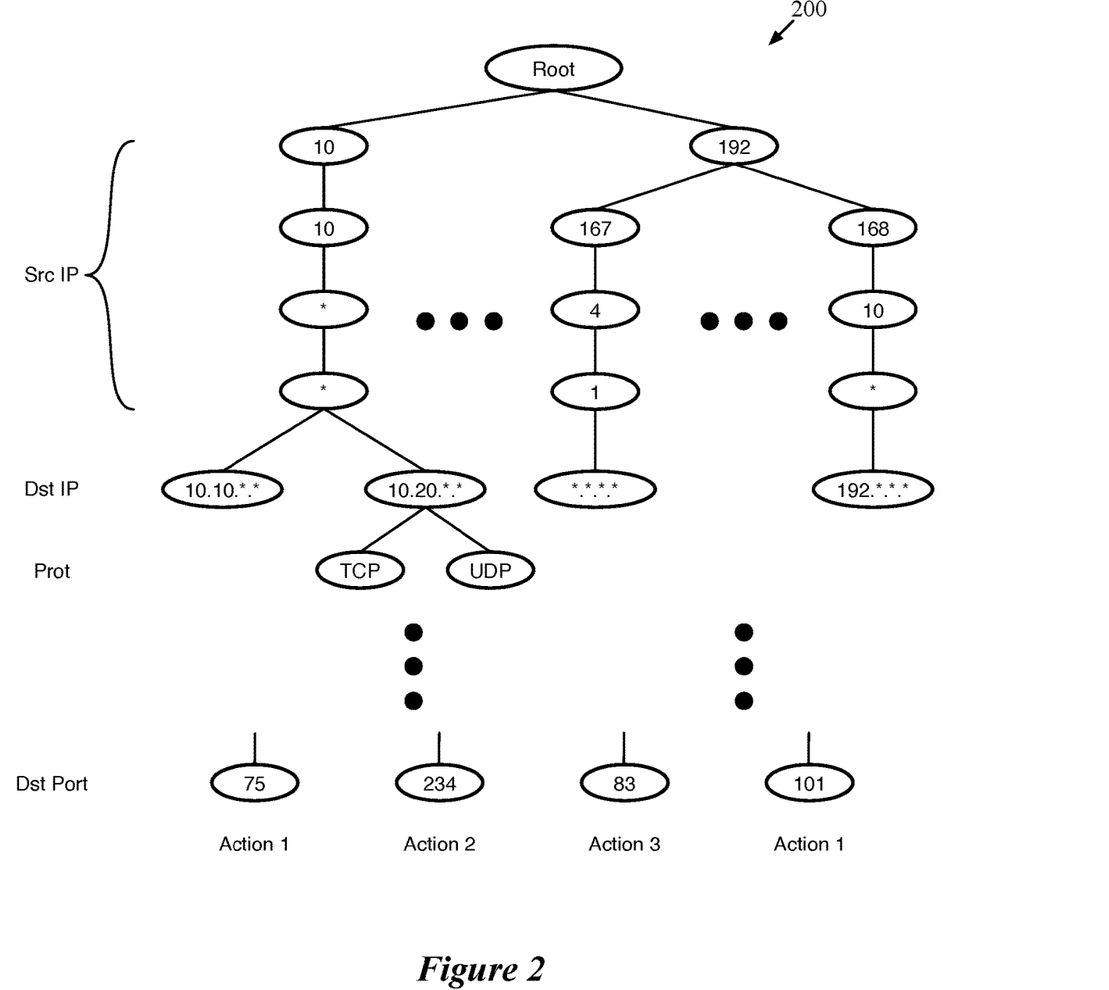
FIG. 2 conceptually illustrates a decision tree classifier of some embodiments, which uses a search tree to identify a matching flow entry.

FIG. 2 conceptually illustrates a decision tree classifier 200 of some embodiments, which uses a search tree to identify a matching flow entry. Each node in the decision tree narrows down the possible matches until the search reaches a leaf node that represents a single matching flow entry (or if all possible matches are eliminated). In some embodiments, each level of the search tree examines a specific bit or set of bits (e.g., a packet header field or portion of a packet header field) of the flow key.

For illustration purposes, some of the nodes are compressed in the decision tree classifier 200. Starting from the root node, the first four levels shown each represent eight bits of a packet's source IP address. The decision tree then flows to the destination IP address, the IP protocol field, etc., ending with the transport layer destination port. For branches in which a particular field or set of bits does not matter, an asterisk is used to represent that this level of the tree is effectively skipped (wildcarded) for that branch. In some embodiments, branches of a tree may have different priorities when wildcards are involved, to ensure that the flow entry found by the search tree classifier for a packet is the highest priority flow entry matched by the packet.

Each of these types of classifiers has advantages and disadvantages. The tuple space search classifier is very easy to update, whereas decision tree classifiers often require an expensive full rebuild of the search tree to accommodate updates (flow entries cannot be easily inserted or deleted). However, as the number of subtables expands, lookups become much slower for the tuple space search classifier, as a new hash computation and lookup is required for each new subtable. The decision tree classifier, on the other hand, is a relatively fast lookup, with the complexity only based on the overall number of levels (i.e., the overall number of packet header fields or sub-fields used as nodes in the search tree).

As such, the forwarding element of some embodiments uses multiple classifiers with multiple different algorithms. Specifically, some embodiments use a decision tree classifier as the primary classifier with a tuple space search classifier as the secondary classifier. The tuple space search classifier is guaranteed to be up to date with all of the most recent flow entry modifications (e.g., new flow entries, deletions of old flow entries, and modifications to the actions of existing flow entries) while the decision tree classifier is rebuilt periodically and thus may not be completely up to date.

Figure 3:
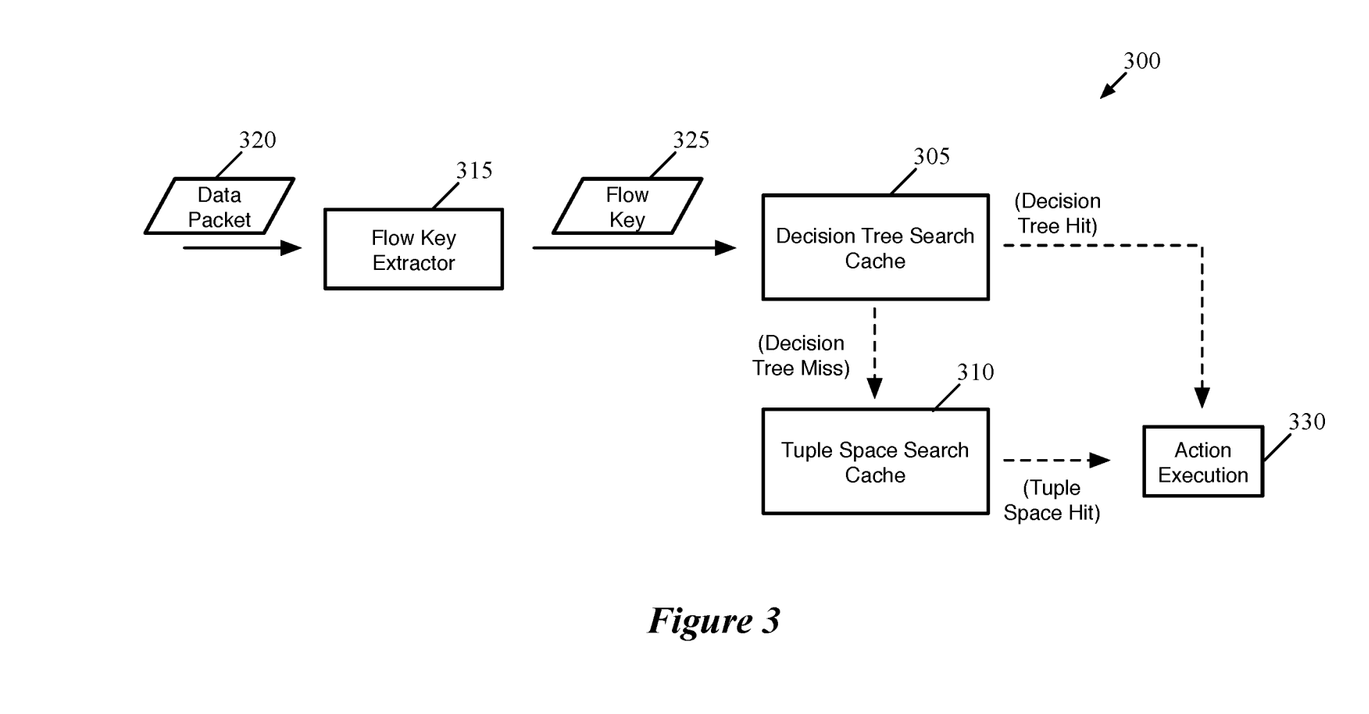
FIG. 3 conceptually illustrates the packet processing structure of a forwarding element with both a decision tree search cache and a tuple space search cache.

FIG. 3 conceptually illustrates the packet processing structure of such a forwarding element 300 with both a decision tree search cache 305 and a tuple space search cache 310. As will be described in more detail below by reference to FIG. 5, the forwarding elements of some embodiments include additional structure (e.g., other layers of classifier, as well as other structure) that are not shown in FIG. 3.

When the forwarding element 300 receives a data packet 320, a flow key extractor 315 analyzes the packet and extracts the packet header field values used by the classifiers 305 and 310. Because the different flow entries used by the forwarding element may match on different sets of packet header fields, the flow key extractor 315 extracts the packet header field values for any field used by at least one flow entry.

This flow key 325 is first provided to the decision tree search cache 305. The decision tree search cache 305 processes the flow key 325 through its search tree. If a cache hit occurs (i.e., a matching flow entry is found), the decision tree search cache 305 provides the specified set of actions for the matching flow entry to the action execution engine 330, which applies the specified actions to the data packet 320.

On the other hand, if no matching flow entry is found in the decision tree search cache 305 (i.e., a cache miss occurs), the flow key 325 is provided to the tuple space search cache 310, which performs a tuple space search through the flow entries to identify a highest-priority matching flow entry. Again, if a cache hit occurs, the tuple space search cache 310 provides the specified set of actions for the matching flow entry to the action execution engine 330, which applies the specified actions to the data packet 320. In addition, as described in further detail below, in certain cases a subset of the subtables of the tuple space search cache are searched even when a cache hit occurs in the decision tree cache 305.

As described above, the decision tree cache is the primary cache (first searched) because the lookups are faster, with the secondary tuple space search used as a backup. Updates are always made to the tuple space search cache as they are received, whereas the decision tree does not receive all updates right away. These updates to the flow entries may include insertion of new flow entries, deletion of existing flow entries, and modifications to the set of actions specified by a flow entry (modifications to the set of match conditions is treated as a deletion of an existing flow entry and insertion of a separate new flow entry). These different types of modifications are treated differently in some embodiments.

Figure 4:
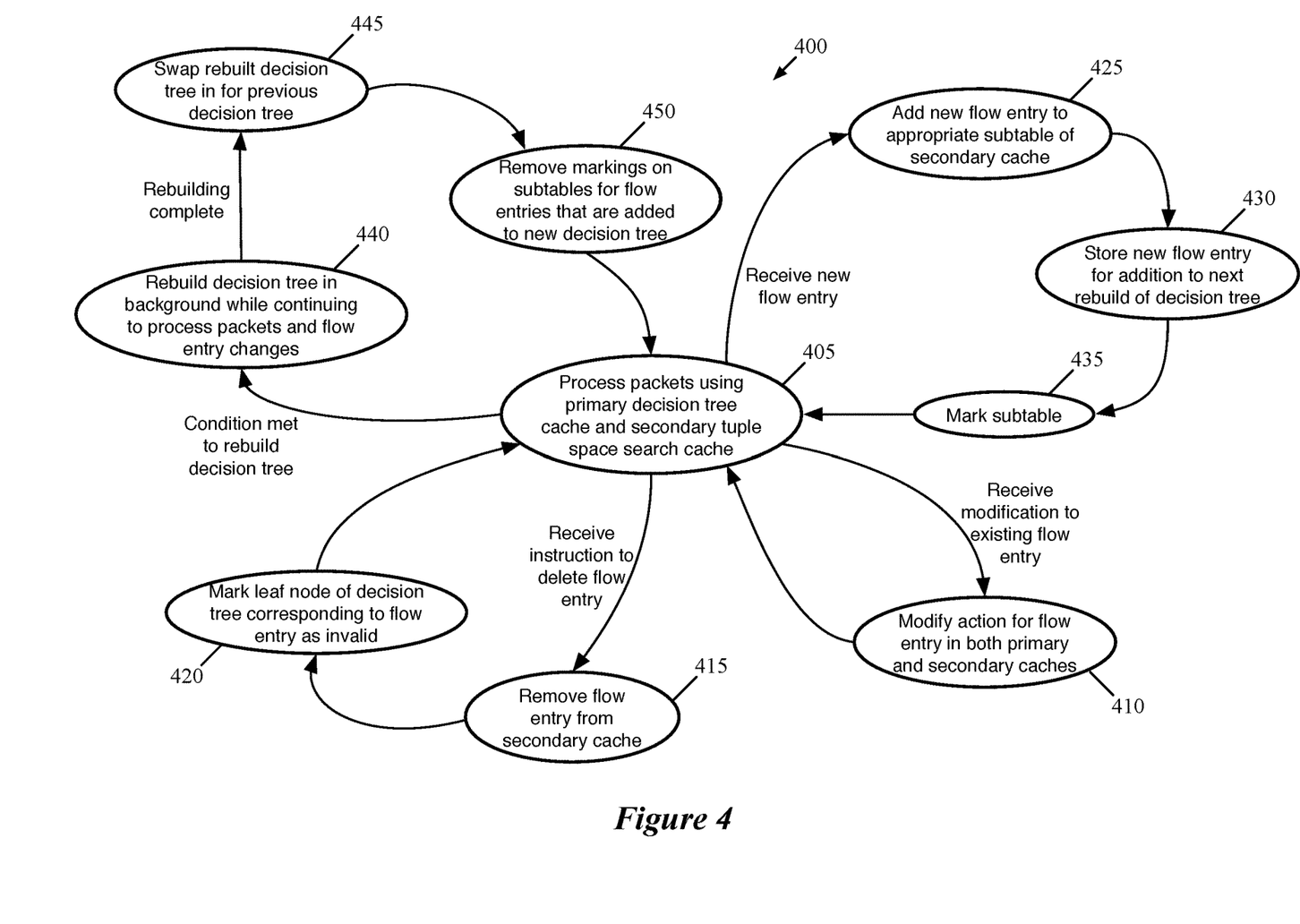
FIG. 4 conceptually illustrates a state diagram that shows states and changes between the states for a forwarding element (e.g., a flow-based software forwarding element) of some embodiments.

FIG. 4 conceptually illustrates a state diagram 400 that shows states and changes between the states for a forwarding element (e.g., a flow-based software forwarding element) of some embodiments. It should be understood that this state diagram 400 does not cover every possible action taken by a forwarding element, but instead specifically describes the states relating to updating the flow entries in a hybrid classifier that uses multiple different algorithms, such as that shown in FIG. 3. For instance, the state diagram does not describe packet processing operations in detail, as well as configuration operations not related to modifying the flow entries in the hybrid classifier.

As shown, when no changes are made, the forwarding element operates in state 405. In state 405, the forwarding element processes packets using a primary decision tree cache and a secondary tuple space search cache. This operation is illustrated in FIG. 3 and described above.

When a modification to an existing flow entry is received (i.e., the set of actions specified by the flow entry is modified), the forwarding element of some embodiments transitions to state 410 to modify the action specified by this flow entry in both the primary cache and the secondary cache. Because the match conditions are not changed, this does not actually affect the structure of the decision tree or the subtables. The forwarding element then transitions back to state 405 to continue processing packets with the two updated caches.

When instructions are received to delete an existing flow entry, the forwarding element transitions to state 415 to remove the flow entry from the appropriate subtable of the secondary cache. Because removing the flow entry from the decision tree would require rebuilding the entire decision tree, the forwarding element instead marks (at state 420) the leaf node corresponding to the deleted flow entry as invalid. The forwarding element then transitions back to state 405 to continue processing packets with the updated caches. If a packet matches the flow entry marked as invalid in the primary decision tree cache, the forwarding element treats this as a cache miss, and moves on to the secondary cache.

When a new flow entry to add is received, the forwarding element transitions to state 425 and adds the flow entry to the appropriate subtable of the secondary cache. If no subtable is yet created for the combination of packet header fields used by the flow entry match conditions, then the forwarding element creates a new subtable for the flow entry. In addition, at state 430, the forwarding element stores the new flow entry for addition to the next rebuild of the decision tree. Because rebuilding the decision tree is a computation-intensive and time-intensive process, the forwarding element does not rebuild the decision tree every time a new flow entry is added. Instead, as described further below, the forwarding element of some embodiments rebuilds the decision tree in the background regularly, using the flow entries added to the tuple space search cache since the previous rebuild.

As described previously, in some embodiments, a classifier can include multiple flow entries with different sets of match conditions that one packet could match, so long as those flow entries have different priorities. However, if a new higher-priority flow entry is only added to the secondary tuple space search cache, then a packet might match a lower-priority flow entry in the primary decision tree cache without the forwarding element searching the secondary cache. To solve this issue, the forwarding element of some embodiments also marks (at state 435) the subtable in the secondary tuple space search cache to which the new flow entry was added. The forwarding element returns to state 405 to continue processing packets. When the forwarding element finds a matching flow entry for a packet in the decision tree cache, the marked subtables in the tuple space search cache are still searched to verify that the packet does not match a higher-priority flow entry that has not yet been added to the decision tree. While this involves extra processing, it ensures that network policy is not violated and is faster than searching all of the subtables of the secondary cache.

The forwarding element also rebuilds the decision tree regularly, when certain prespecified conditions are met. As shown, when these conditions are met, the forwarding element transitions to state 440 to rebuild the decision tree in the background while continuing to process packets with the existing decision tree. This rebuild uses all of the new flow entries stored since the previous rebuild and removes all of the flow entries marked as invalid in the current decision tree. The conditions for the forwarding element to initiate this rebuild may be the expiration of a timed interval (e.g., rebuilding every 5 seconds, every minute, etc.), once the cache miss rate for the decision tree exceeds a threshold, etc. At this point, in some embodiments, additional flow entry changes are processed by storing new flow entries for the subsequent rebuild. Flow entry removals received after the initiation of the rebuild are marked as invalid in the current decision tree as well as the rebuilt decision tree (once that rebuild is complete). Similarly, if the actions for a flow entry are modified, then the forwarding element modifies these actions for both the current decision tree as well as the rebuilt decision tree.

Once the decision tree rebuild is complete, the forwarding element transitions to state 445 to swap the rebuilt decision tree in for the previous decision tree. In some embodiments, both of these decision trees are objects, so this swap involves modifying a reference to point to the new decision tree instead of the old tree. In addition, the forwarding element removes (at state 450) the markings on subtables in the secondary tuple space search cache for flow entries that were added to the new decision tree. Any subtables marked for flow entries that were received during the rebuild and thus are not added to the new decision tree remain, however. The forwarding element then transitions back to state 405 to continue processing packets using the primary decision tree cache and the secondary tuple space search cache.

In some embodiments, the multiple classifiers with multiple different search algorithms replace one of several classifiers used by a forwarding element. For example, some forwarding elements include (i) an exact-match cache that searches on a single set of packet headers for all packets such that each flow entry is only matched by a single data flow, (ii) an aggregate cache that searches on different sets of packet headers and for which each flow entry may be matched by multiple data flows, and (iii) a set of staged flow entry tables used when packets do not match any entries in the exact-match cache or the aggregate cache. The forwarding element generates the aggregate cache flow entries based on a first packet for a data flow (or set of data flows) being processed through the multiple stages of flow tables. In some embodiments, the decision tree cache is added as a primary aggregate cache, with the tuple space search used as a secondary aggregate cache.

Figure 5:
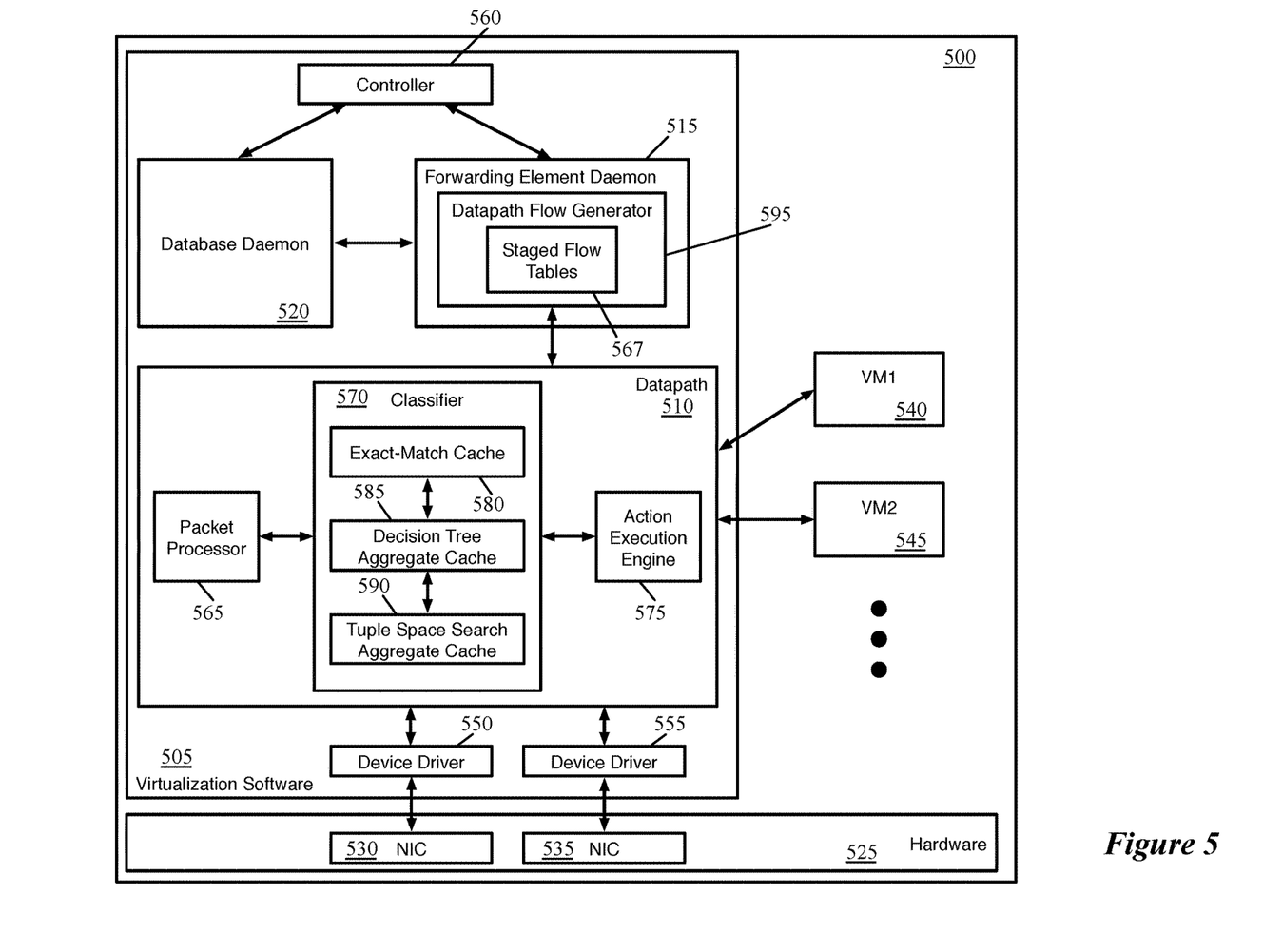
FIG. 5 conceptually illustrates the architecture of a host computer on which a flow-based software forwarding element of some embodiments executes.

FIG. 5 conceptually illustrates the architecture of a host computer 500 on which such a flow-based software forwarding element of some embodiments executes. In some embodiments, as shown in this case, the forwarding element executes in the virtualization software (e.g., the hypervisor) 505 of the host computer 500. In other embodiments, however, the forwarding element may execute within a virtual machine or other data compute node, on a bare metal device, etc. In this example, the forwarding element includes several components, including a datapath 510 as well as a forwarding element daemon 515 and a database daemon 520. In some embodiments, the forwarding element daemon 515 and database daemon 520 execute in the user space of the virtualization software 505 while the datapath 510 executes in the virtualization software kernel. In other embodiments, however, all of these modules execute in the user space. In addition, in some embodiments, the datapath 510 executes in one or more NICs 530 and 535 (e.g., using SmartNIC capabilities).

As shown in FIG. 5, the host computer 500 includes hardware 525 (although this is a software architecture diagram, the hardware 525 is displayed in order to represent the network interface controllers (NICs) 530 and 535 of the host computer). The hardware 525 may include typical computer hardware (e.g., one or more processing units, volatile memory (e.g., RAM), non-volatile memory (e.g., hard disk, solid-state memory, etc.), network adapters, etc.). As shown, the hardware 525 also includes NICs 530 and 535 for connecting the host computer 500 to a physical network.

The virtualization software 505 is a software abstraction layer that operates on top of the hardware 525 and below any operating system in some embodiments. The virtualization software 505 performs various virtualization functionalities to virtualize the hardware 525 for several virtual machines (or other data compute nodes) operating on the host computer 500. The virtualization software handles various management tasks, such as memory management, processor scheduling, or any other operations for controlling the execution of the VMs 540 and 545 (and others) operating on the host computer 500.

The virtualization software 505 also includes device drivers 550 and 555 for the NICs 530 and 535, respectively. These device drivers 550 and 555 allow an operating system to interact with the hardware of the host computer 500 in some embodiments. The VMs 540 and 545 are independent VMs operating on the host computer 500 and may run any number of different operating systems (e.g., Linux, Solaris, FreeBSD, or any other type of UNIX based operating system, Windows-based operating systems, etc.).

The forwarding element daemon 515 is an application that runs in the background of the virtualization software 505 in some embodiments. The forwarding element daemon 515 of some embodiments receives configuration data from a network controller 560 and the database daemon 520. The network controller 560 is shown as a local controller operating in the virtualization software 505 in this example, but in other embodiments operates on a separate physical machine to manage several host computers. From the controller, the forwarding element daemon 515 receives flow entries that the forwarding element daemon stores in its staged flow tables 567. In some embodiments, these flow tables are organized in stages (e.g., stages of packet processing), with one or more stages for each of several logical forwarding elements. For instance, a logical switch might have an ingress mapping stage, an ingress ACL stage, a logical forwarding stage, an egress ACL stage, etc.). For a forwarding element implementing multiple logical networks, each of the logical networks has several stages of flow tables in some embodiments.

In some embodiments, the forwarding element daemon 515 communicates with the network controller 560 using the OpenFlow Protocol, while the database daemon 520 communicates with the network controller 560 through a database communication protocol (e.g., OVSDB protocol). The database protocol of some embodiments is a JavaScript Object Notation (JSON) remote procedure call (RPC) based protocol.

The database daemon 520 is also an application that runs in the background of the virtualization software 505 in some embodiments. The database daemon 520 of some embodiments communicates with the network controller 560 in order to configure certain aspects of the forwarding element other than the installation of flow entries. For instance, the database daemon 520 receives management information from the network controller 560 for configuring bridges, ingress ports, egress ports, QoS configurations for ports, etc., and stores the information in a set of databases that help define the configuration of the forwarding element.

The datapath 510 of some embodiments provides the primary packet processing modules of the forwarding element. Packets received by the forwarding element (e.g., from the external network via the NICs 530 and 535 or from the VMs 540 and 545) are initially processed by the datapath 510. As shown, the datapath 510 includes a packet processor 565, a classifier 570, and an action execution engine 575.

The packet processor 565 receives a packet and parses the packet to identify the packet header field values used by the classifier 570 to find a matching flow entry. In some embodiments, the packet processor 565 identifies all of the packet header field values for use by the exact-match cache, with the decision tree aggregate cache and the tuple space search cache using a subset of these packet header field values. In some embodiments, the packet processor stores these header values in one or more registers that are used to store data for the packet (which may be treated as an object for processing by the forwarding element).

The classifier 570 accesses one or more datapath caches to find matching flow entries for received packets. In some embodiments, as shown in the figure, the classifier 570 includes an exact-match cache 580 and two aggregate caches (the decision tree cache 585 and tuple space search cache 590). In some embodiments, the classifier first searches the exact-match cache 580, then rather than a single aggregate cache uses the decision tree aggregate cache 585 as a primary aggregate cache and the tuple space search aggregate cache 590 as a secondary aggregate cache in the manner described above.

The exact-match cache 580 of some embodiments contains flow entries that are matched by packets having a unique set of packet header field values (i.e., packets from a specific data flow). In some embodiments, the flow entries in the exact-match cache 580 are installed by the classifier 570 based on (i) the forwarding element daemon 515 processing a packet through the set of flow tables 567 or (ii) processing of a packet according to a matched flow entry in one of the aggregate caches 585 or 590. Because all of the flow entries in the exact match cache 580 match on the same set of packet header fields, only a single hash table is searched and thus using a decision tree as a primary cache does not result in the same search time benefits as for the aggregate cache.

The aggregate caches 585 and 590 contain flow entries each of which is matched by packets falling into a particular traffic aggregate class. That is, each of the flow entries in the aggregate caches 585 and 590 specifies a subset of the packet header values for which it requires a match, with the other packet header fields being wildcarded (i.e., a packet can match the flow entry while having any values for the wildcarded fields). In some embodiments, the flow entries in the aggregate caches 585 and 590 are installed by the classifier 570 based on the forwarding element daemon 515 processing a packet through the set of flow tables 567. The classifier installs these flow entries in the manner described above by reference to FIG. 4 in some embodiments.

When the classifier 570 receives the header values for a packet, it first performs a lookup in the exact-match cache 580 to find a flow entry matched by the packet. When none is found, the classifier 570 next performs a lookup in the decision tree aggregate cache 585, backed by the tuple space search aggregate cache 590 as described above by reference to FIG. 3. When no matching flow entries are found (i.e., for the first packet of a data flow that is different enough from the previously-received data flows so that the packet does not match any of the flow entries in the aggregate caches 585 and 590), the forwarding element shifts control of the packet processing to the forwarding element daemon 515 for a full set of packet processing operations (i.e., executing of numerous lookup stages over the flow tables 567, which is more computationally expensive). One primary distinction between the caches 580-590 and the set of flow tables 567 is that there is at most only one matching flow entry in each of the datapath caches, and therefore priorities are not required in this case (though, as described above, the caches could also be set up to use priority values). Each cached flow entry in the datapath specifies all of the actions to take in order to process a packet matching that flow entry, whereas each of the flow entries in the tables 567 only specify the actions for that stage, often specifying a resubmit action for processing by the next packet processing stage.

If the classifier 570 finds a matching flow entry in one of the caches 580-590, the action execution engine 575 receives the packet and executes the set of actions specified by the matching flow entry. When a packet requires processing by the forwarding element daemon 515, the action execution engine 575 of some embodiments receives, from the forwarding element daemon 515, the packet and a set of instructions for actions to perform on the packet.

The forwarding element daemon 515 of some embodiments includes a datapath flow generator 595. The datapath flow generator 595 is a component of the forwarding element that makes forwarding and other packet processing decisions. For any packet that is not matched in the datapath caches 580-590 (e.g., because the packet is the first in a new data flow), the datapath flow generator 595 performs the one or more flow table lookups required to process the packet, and then generates a new flow entry to install in the aggregate caches 585 and 590 (and, in some embodiments, the exact match cache 580). The generation of these aggregate cache flow entries (also referred to as megaflows) are described in further detail in U.S. Pat. Nos. 9,602,398 and 9,686,185, both of which are incorporated herein by reference.

Figure 6:
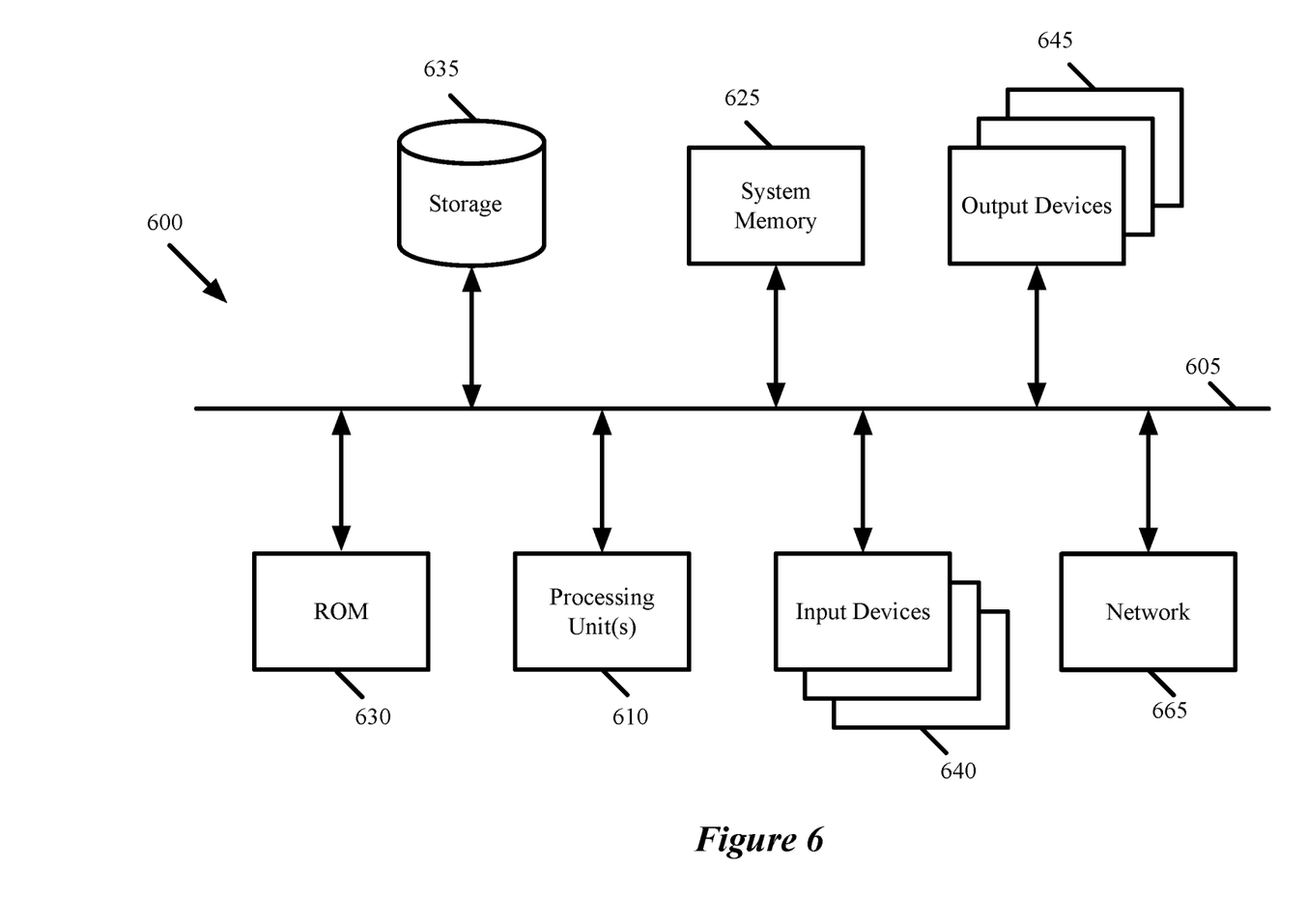
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random-access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
    at a forwarding element that stores (i) a first flow cache comprising a decision tree and (ii) a second flow cache comprising a plurality of tables:
        determining whether a received data message matches any flow entry in the first flow cache by searching the decision tree, wherein nodes of the decision tree match on at least portions of a plurality of different header fields of the data message;
        when the data message does not match any flow entry in the first flow cache because a plurality of header field values of the data message are not represented by any branch of the decision tree, determining whether the data message matches any flow entry in the second flow cache, wherein each table in the plurality of tables matches on a different set of header fields of the data message; and
        when the data message matches a flow entry in one of the first and second flow caches, executing a set of actions specified by the flow entry.

2. The method of claim 1, wherein the decision tree comprises a plurality of levels of nodes, each respective level corresponding to a different respective portion of a data message header field.

3. The method of claim 1, wherein:
    a particular flow entry is represented in both the first flow cache and the second flow cache;
    the particular flow entry is represented in the first flow cache as a particular path through the nodes of the decision tree; and
    the particular flow entry is represented in the second flow cache as a flow entry in only a particular one of the tables of the plurality of tables.

4. The method of claim 3, wherein:
    the particular flow entry matches on a particular set of header fields of received data messages;
    the particular table comprises a plurality of different flow entries that match on the particular set of header fields of received data messages, while other tables in the plurality of tables comprise other sets of flow entries that match on different sets of header fields; and
    the particular path through the nodes of the decision tree comprises nodes that match on at least portions of the particular set of header fields.

5. The method of claim 1, wherein the first flow cache is faster for the forwarding element to search than the second flow cache while the second flow cache is faster for the forwarding element to update than the first flow cache.

6. The method of claim 5, wherein:
    the second flow cache is kept up to date for any change to the flow entries; and
    the decision tree of the first flow cache is periodically rebuilt and is not always up to date between rebuilds.

7. The method of claim 6, wherein:
    modifications to flow entries are incorporated into both the first and second flow caches without delay;
    new flow entries are incorporated into the second flow cache without delay and are not incorporated into the first flow cache until the decision tree is rebuilt; and
    deleted flow entries are removed from the second flow cache without delay and are marked as invalid in the first flow cache until the decision tree is rebuilt.

8. The method of claim 6, wherein the decision tree is rebuilt after a fixed period of time.

9. The method of claim 6, wherein the decision tree is rebuilt after a rate of data messages that fail to match any flow entries in the first flow cache exceeds a threshold.

10. The method of claim 1, wherein:
    the first and second caches are aggregate caches; and
    each of a plurality of flow entries in the first and second caches specifies a respective set of actions to execute on data messages for an aggregate group of data flows that have a set of packet header field values in common.

11. A non-transitory machine-readable medium storing a forwarding element for execution by at least one processing unit, the forwarding element storing (i) a first flow cache comprising a decision tree and (ii) a second flow cache comprising a plurality of tables, the forwarding element comprising sets of instructions for:
    determining whether a received data message matches any flow entry in the first flow cache by searching the decision tree, wherein nodes of the decision tree match on at least portions of a plurality of different header fields of the data message;

when the data message does not match any flow entry in the first flow cache because a plurality of header field values of the data message are not represented by any branch of the decision tree, determining whether the data message matches any flow entry in the second flow cache, wherein each table in the plurality of tables matches on a different set of header fields of the data message; and when the data message matches a flow entry in one of the first and second flow caches, executing a set of actions specified by the flow entry.

12. The non-transitory machine-readable medium of claim 11, wherein the decision tree comprises a plurality of levels of nodes, each respective level corresponding to a different respective portion of a data message header field.

13. The non-transitory machine-readable medium of claim 11, wherein:

a particular flow entry is represented in both the first flow cache and the second flow cache;

the particular flow entry is represented in the first flow cache as a particular path through the nodes of the decision tree; and the particular flow entry is represented in the second flow cache as a flow entry in only a particular one of the tables of the plurality of tables.

14. The non-transitory machine-readable medium of claim 13, wherein:

the particular flow entry matches on a particular set of header fields of received data messages;

the particular table comprises a plurality of different flow entries that match on the particular set of header fields of received data messages, while other tables in the plurality of tables comprise other sets of flow entries that match on different sets of header fields; and the particular path through the nodes of the decision tree comprises nodes that match on at least portions of the particular set of header fields.

15. The non-transitory machine-readable medium of claim 11, wherein the first flow cache is faster for the forwarding element to search than the second flow cache while the second flow cache is faster for the forwarding element to update than the first flow cache.

16. The non-transitory machine-readable medium of claim 15, wherein:

the second flow cache is kept up to date for any change to the flow entries; and the decision tree of the first flow cache is periodically rebuilt and is not always up to date between rebuilds.

17. The non-transitory machine-readable medium of claim 16, wherein:

modifications to flow entries are incorporated into both the first and second flow caches without delay;

new flow entries are incorporated into the second flow cache without delay and are not incorporated into the first flow cache until the decision tree is rebuilt; and deleted flow entries are removed from the second flow cache without delay and are marked as invalid in the first flow cache until the decision tree is rebuilt.

18. The non-transitory machine-readable medium of claim 16, wherein the decision tree is rebuilt after a fixed period of time.

19. The non-transitory machine-readable medium of claim 16, wherein the decision tree is rebuilt after a rate of data messages that fail to match any flow entries in the first flow cache exceeds a threshold.

20. The non-transitory machine-readable medium of claim 11, wherein:

the first and second caches are aggregate caches; and each of a plurality of flow entries in the first and second caches specifies a respective set of actions to execute on data messages for an aggregate group of data flows that have a set of packet header field values in common.

* * * * *